United States Patent
Zhang

(10) Patent No.: US 8,320,973 B2
(45) Date of Patent: Nov. 27, 2012

(54) CALL DISCONNECT SYSTEM AND METHOD FOR A MOBILE DEVICE

(75) Inventor: Tao Zhang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 308 days.

(21) Appl. No.: 12/792,738

(22) Filed: Jun. 3, 2010

(65) Prior Publication Data

US 2011/0151841 A1 Jun. 23, 2011

(30) Foreign Application Priority Data

Dec. 17, 2009 (CN) .......................... 2009 1 0311705

(51) Int. Cl.
*H04B 1/38* (2006.01)
*H04M 3/42* (2006.01)

(52) U.S. Cl. ..................... 455/567; 455/414.1; 455/415; 455/456.4

(58) Field of Classification Search .................. 455/567, 455/456.3, 456.4, 415, 417, 418, 413, 414.1
See application file for complete search history.

(56) References Cited

U.S. PATENT DOCUMENTS

| 5,327,486 | A * | 7/1994 | Wolff et al. ................. 379/93.23 |
| 6,400,814 | B1 * | 6/2002 | Adams ...................... 379/142.01 |
| 7,103,167 | B2 * | 9/2006 | Brahm et al. ............ 379/211.02 |
| 7,239,693 | B2 * | 7/2007 | Silver ....................... 379/373.03 |
| 7,529,564 | B2 * | 5/2009 | Silver ............................ 455/567 |
| 8,050,387 | B1 * | 11/2011 | Putnam et al. .................. 379/76 |
| 8,243,898 | B2 * | 8/2012 | Holt et al. ................ 379/201.01 |
| 8,270,588 | B2 * | 9/2012 | Schwartz ................. 379/210.02 |
| 2001/0005681 | A1 * | 6/2001 | Kim ............................... 455/458 |
| 2005/0130631 | A1 * | 6/2005 | Maguire et al. ............ 455/414.1 |
| 2005/0227740 | A1 * | 10/2005 | Orbach ......................... 455/567 |
| 2007/0121920 | A1 * | 5/2007 | Silver ....................... 379/376.02 |
| 2007/0213100 | A1 * | 9/2007 | Osann ........................... 455/567 |

* cited by examiner

*Primary Examiner* — Duc M Nguyen
(74) *Attorney, Agent, or Firm* — Altis Law Group, Inc.

(57) ABSTRACT

A disconnection system and a method of a mobile device include setting a keystroke instruction and a time limit, and displaying an incoming call prompt interface on a display of the mobile device when an incoming call request is received. The disconnection method further includes exiting the incoming call prompt interface if the disconnection keystroke instruction is received, and disconnecting the network connection if a network connection time of the incoming call is not less than the time limit.

15 Claims, 3 Drawing Sheets

CALL DISCONNECT SYSTEM AND METHOD FOR A MOBILE DEVICE

BACKGROUND

1. Technical Field

Embodiments of the present disclosure are related to communication, and in particular, to a call disconnect system and method for a mobile device.

2. Description of Related Art

Sometimes, when a mobile device receives an incoming call, the callee does not want to answer at that moment, for example, when the callee is in a meeting. If the callee refuses the call, however, the caller may misunderstand the meaning and think the callee is rude. In addition, the callee cannot use the mobile device if the incoming call has not been disconnected.

What is needed, therefore, is an improved system and method for overcoming the aforementioned problem.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
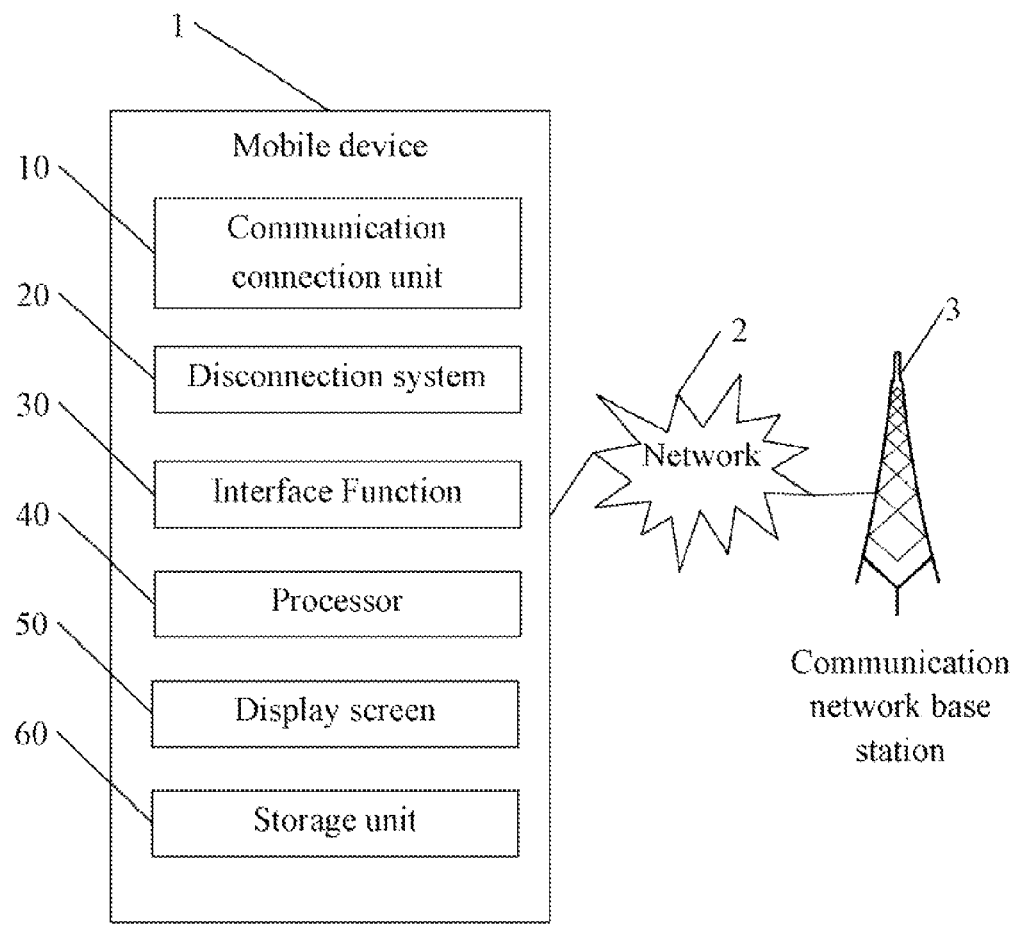
FIG. 1 is a block diagram of one embodiment of a mobile device including a disconnection system.

FIG. 1 is a block diagram of one embodiment of a mobile device 1 including a disconnection system 20. The mobile device 1 connects to a communication network base station 3 through a network 2. The communication network base station 3 may send an incoming call request to the mobile device 1 through the network 2. The mobile device 1 includes a communication connection unit 10 and a function interface 30. When the mobile device 1 receives an incoming call request, the communication connection unit 10 may establish a network connection between the mobile device 1 and the communication network base station 3. The function interface 30 provides various interface functions for the mobile device 1. For example, "ITAPI_IsVoiceCall" is a function of disconnecting the network connection and "App_ExitVoiceCallView" is a function of exiting a user interface (UI) and stopping output of call rings of the mobile device 1. The mobile device 1 further includes a display screen 50, a processor 40, and a storage unit 60. The storage unit 60 may be a memory of the mobile device 1, and also may be an external storage card, such as a smart media (SM) card or a secure digital (SD) card, for example.

Figure 2:
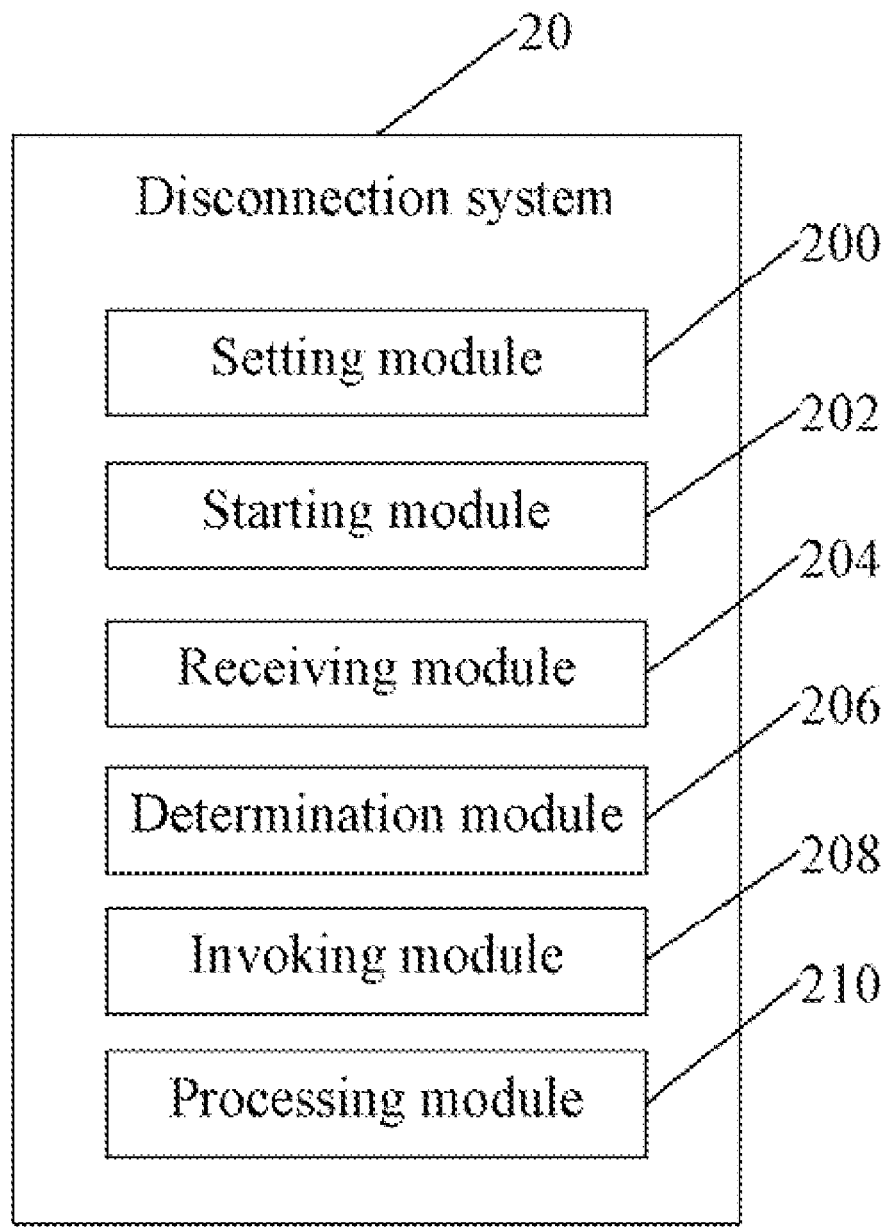
FIG. 2 is a block diagram of one embodiment of the disconnect system in FIG. 1.

FIG. 2 is a block diagram of one embodiment of the disconnection system 20 in FIG. 1. The disconnection system 20 comprises a setting module 200, a starting module 202, a receiving module 204, a determination module 206, an invoking module 208, and a processing module 210. The modules 200, 202, 204, 206, 208, and 210 may comprise one or more computerized codes to be executed by the processor 40 to perform one or more operations of the mobile device 1. Details of these operations will be provided below.

The setting module 200 sets a disconnection keystroke instruction to an input system (e.g., a keypad or a touchscreen) of the mobile device 1 for disconnecting an incoming call, and sets a time limit T. The setting module 200 sets a hotkey to the input system of the mobile device to invoke the disconnection keystroke instruction. In one embodiment, the keystroke may be any keystroke except for an answer keystroke, an end keystroke or a mute keystroke. It is understood that the answer keystroke may answer the incoming call, the end keystroke may disconnect the incoming call, and the mute keystroke may switch the mobile device 1 to a silent mode. The time limit T is a threshold value for how long the disconnect system 20 should wait for an action by the user before automatically disconnecting a network connection of the mobile device 1. In one embodiment, the time limit T may be set as 15 seconds, 25 seconds, or other values according to user requirements.

The starting module 202 starts the communication connection unit 10, displays an incoming call prompt interface on the display screen 50, and outputs call rings of the incoming call when communication network base station 3 sends an incoming call request to the mobile device 1 through the network 2.

The receiving module 204 receives a keystroke instruction from the keypad or the touchscreen of the mobile device 1. It may be understood that the keypad can comprise a plurality of numbers and/or symbols, and the touchscreen may display a virtual keypad comprising a plurality of numbers and/or symbols for input.

The determination module 206 determines whether the received keystroke instruction is the disconnection keystroke instruction.

If the received keystroke instruction is the disconnection keystroke instruction, the invoking module 208 exits the incoming call prompt interface and stops output of call rings of the incoming call according to the function interface 30.

The processing module 210 returns a previous interface of the mobile device 1 when the received keystroke instruction is the disconnection keystroke instruction. In one embodiment, the previous interface is an interface before the mobile device 1 receives the incoming call. For example, the previous interface may be a message modification interface or a game interface.

If the received keystroke instruction is not the disconnection keystroke instruction, the processing module 210 further processes the received keystroke instruction. In one embodiment, if the mobile device 1 receives a keystroke instruction to answer the incoming call, after the processing module 210 gives the keystroke instruction to the mobile device 1 for processing, the mobile device 1 answers the incoming call. If the disconnection keystroke instruction of ending the incoming call is received, after the processing module 210 gives the keystroke instruction to the mobile device 1 for processing, the mobile device 1 ends the incoming call directly.

The determination module 206 further determines whether a network connection time of the incoming call is less than the time limit T.

The processing module 210 maintains the network connection if the network connection time of the incoming call is less than the time limit T. In one embodiment, during the time limit T, the processing module 210 disables the answer keystroke and the end keystroke. That is, if the answer keystroke or the end keystroke is pressed during the time limit T, the processing module 210 does not answer or end the incoming call.

The invoking module 208 further disconnects the network connection of the incoming call if the network connection time is not less than the time limit T.

Figure 3:
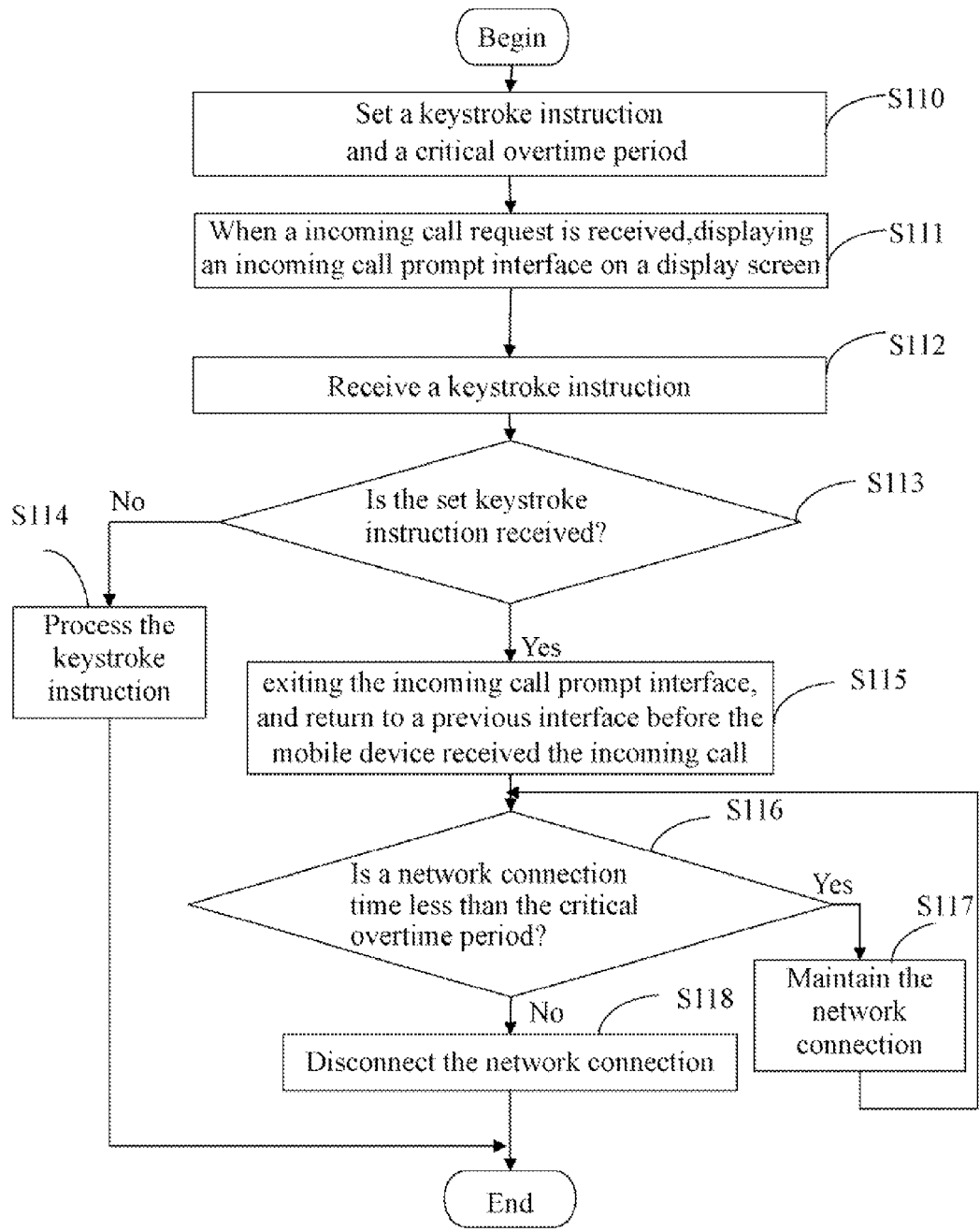
FIG. 3 is a flowchart of one embodiment of a method for disconnecting a call for the mobile device of FIG. 1.

FIG. 3 is a flowchart of one embodiment of a method for disconnecting the mobile device of FIG. 1. Depending on the embodiment, additional blocks may be added, others removed, and the ordering of the blocks may be changed.

In block S110, the setting module 200 sets a disconnection keystroke instruction to the input system of the mobile device 1 for disconnecting an incoming call, and sets a time limit T. The setting module 200 sets a hotkey to the system of the mobile device 1 to invoke the disconnection keystroke instruction. As mentioned above, the time limit T is a threshold value for how long the disconnect system 20 should wait for an action by the user before automatically disconnecting a network connection of the mobile device 1.

In block S111, when communication network base station 3 sends an incoming call request to the mobile device 1 through network 2, the starting module 202 starts the communication connection unit 10, displays an incoming call prompt interface on the display screen 50, and outputs call rings of the incoming call.

In block S112, the receiving module 204 receives a keystroke instruction from the keypad or the touchscreen of the mobile device 1.

In block S113, the determination module 206 determines whether the received keystroke instruction is the disconnection keystroke instruction.

If the received keystroke instruction is not the disconnection keystroke instruction, in block S114, the processing module 210 processes the received keystroke instruction, and the procedure is end. If the received keystroke instruction is the disconnection keystroke instruction, in block S115, the invoking module 208 exits the incoming call prompt interface, and stops output of the call rings of the incoming call from the function interface 30, and the processing module 210 returning a previous interface before the mobile device 1 received the incoming call.

In block S116, the determination module 206 further determines whether a network connection time of the incoming call is less than the time limit T.

If the network connection time of the incoming call is less than the time limit T, in block S117, the processing module 210 further maintains the network connection 1, and the procedure turns back to the block S116. In one embodiment, during the time limit T, the processing module 210 disables the answer keystroke and the end keystroke. That is, if the answer keystroke or the end keystroke is pressed during the time limit T, the processing module 210 does not answer or end the incoming call.

If the network connection time of the incoming call is not less than the time limit T, the invoking module 208 further disconnects the network connection of the incoming call.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be comprised herein within the scope of this disclosure and the above-described inventive embodiments, and the present disclosure is protected by the following claims.

What is claimed is:

1. A communication method of a mobile device, the method comprising:
   (a) setting a keystroke instruction to an input system of the mobile device for disconnecting an incoming call of the mobile device, and setting a time limit;
   (b) displaying an incoming call prompt interface on a display screen of the mobile device when the incoming call request is received;
   (c) determining if the mobile device receives the disconnection keystroke instruction;
   (d) exiting the incoming call prompt interface and displaying a previous interface of the mobile device on the display screen before the mobile device received the incoming call if the mobile device receives the disconnection keystroke instruction;
   (e) determining whether a network connection time of the incoming call is less than the time limit; and
   (f) disconnecting the network connection if the network connection time of the incoming call is not less than the time limit.

2. The method as described in claim 1, wherein step (b) further comprises:
   (b1) outputting call rings of the incoming call.

3. The method as described in claim 2, wherein step (e) further comprises:
   (d1) stopping output of the call rings of the incoming call if the mobile device receives the disconnection keystroke instruction.

4. The method as described in claim 1, wherein step (g) further comprises:
   (f1) returning to step (e) and maintaining the network connection if the network connection time of the incoming call is less than the time limit.

5. The method as described in claim 1, wherein step (a) further comprises:
   setting a hotkey to the input system of the mobile device to invoke the disconnection keystroke instruction, the disconnection keystroke instruction being any keystroke except for an answer keystroke, an end keystroke, or a mute keystroke of the mobile device.

6. A storage medium storing a set of instructions, the set of instructions capable of being executed by a processor to perform a communication method of a mobile device, the method comprising:
   (a) setting a keystroke instruction to an input system of the mobile device for disconnecting an incoming call, and setting a time limit;
   (b) displaying an incoming call prompt interface on a display screen of the mobile device when the incoming call request is received;
   (c) determining if the mobile device receives the disconnection keystroke instruction;
   (d) exiting the incoming call prompt interface and displaying a previous interface of the mobile device on the display screen before the mobile device received the incoming call if the mobile device receives the disconnection keystroke instruction;

(e) determining whether a network connection time of the incoming call is less than the time limit; and (f) disconnecting the network connection if the network connection time of the incoming call is not less than the time limit.

7. The storage medium as described in claim 6, wherein step (b) further comprises:

(b1) outputting call rings of the incoming call.

8. The storage medium as described in claim 7, wherein step (d) further comprises:

(d1) stopping output of the call rings of the incoming call if the mobile device receives the disconnection keystroke instruction.

9. The storage medium as described in claim 6, wherein step (f) further comprises:

(f1) returning to step (e) and maintaining the network connection if the network connection time of the incoming call is less than the time limit.

10. The storage medium as described in claim 6, wherein step (a) further comprises:

setting a hotkey to the input system to invoke the disconnection keystroke instruction, the disconnection keystroke instruction being any keystroke except for an answer keystroke, an end keystroke or a mute keystroke of the mobile device.

11. A disconnection system of a mobile device, the system comprising:

a storage unit;

a display screen;

at least one processor; and one or more programs stored in the storage unit and being executable by the at least one processor, the one or more programs comprising:

a setting module operable to set a disconnection keystroke instruction to an input system of the mobile device for disconnecting an incoming call, and set a time limit;

a starting module operable to display an incoming call prompt interface on the display screen of the mobile device when the incoming call request is received;

a receiving module operable to receive a keystroke instruction to the input system of the mobile device;

a determination module operable to determining if the mobile device receives the disconnection keystroke instruction;

an invoking module operable to exiting the incoming call prompt interface if the mobile device receives the disconnection keystroke instruction;

a processing module operable to display a previous interface of the mobile device on the display screen before the mobile device received the incoming call, if the mobile device receives the disconnection keystroke instruction;

the determining module further operable to determine whether a network connection time of the incoming call is less than the time limit; and the invoking module further operable to disconnect the network connection if the network connection time of the incoming call is not less than the time limit.

12. The system as described in claim 11, wherein the processing module further operable to maintain the network connection when the network connection time of the incoming call is less than the time limit T.

13. The system as described in claim 11, wherein the starting module further operable to output call rings of the incoming call.

14. The system as described in claim 13, wherein the invoking module further operable to stop output of the call rings of the incoming call if the mobile device receives the disconnection keystroke instruction.

15. The system as described in claim 11, wherein the setting module further operable to set a hotkey to the input system of the mobile device to invoke the disconnection keystroke instruction, the disconnection keystroke instruction being any keystroke except for an answer keystroke, an end keystroke or a mute keystroke of the mobile device.

\* \* \* \* \*